United States Patent Office 3,403,392
Patented Sept. 24, 1968

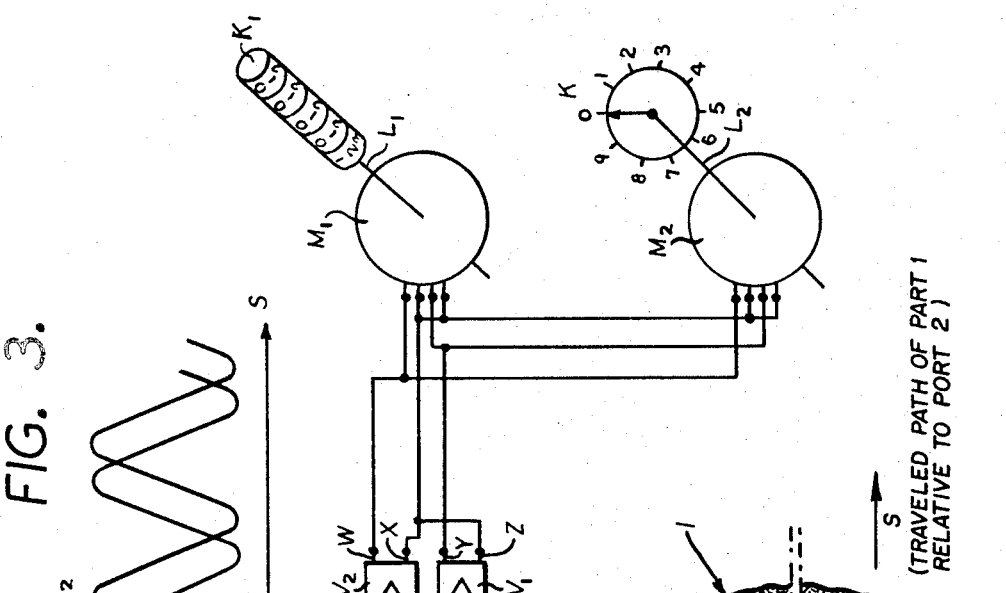

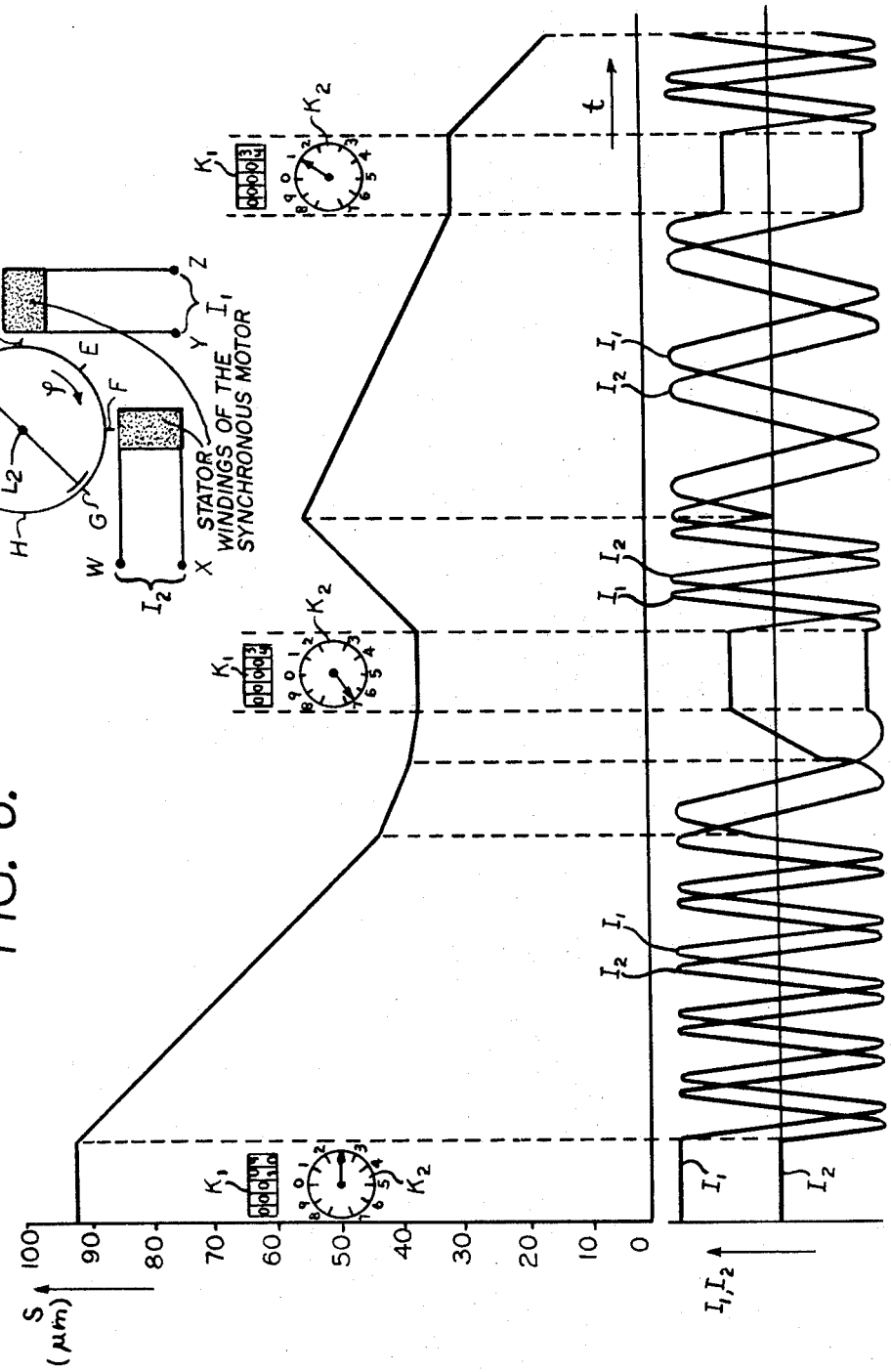

3,403,392
APPARATUS FOR MEASURING OF LENGTHS
BY IMPULSE COUNTING
Horst Wogatzke, Dusseldorf-Grafenberg, Germany, assignor to Wenczler & Heidenhain, Traunreut, near Traunstein, Germany, a corporation of Germany
Filed July 31, 1964, Ser. No. 386,695
Claims priority, application Germany, Aug. 1, 1963, W 35,000
2 Claims. (Cl. 340—347)

ABSTRACT OF THE DISCLOSURE

An apparatus for measuring the position of two parts longitudinally or rotatably movable relative to each other comprising a light source for passing light through an immovable grid and a grid of a photo-electric cell disposed parallel thereto and reciprocable or rotatably movable in its plane. An indicating device is electrically connected to the photo-electric cell for transmitting impulses received from the photo-electric cell, and comprises electronic multi-vibrators and counting arrangements for providing an indication of the measurement and includes a synchronous motor having a rotor including a shaft, the counter including a drive shaft with the rotor shaft coupled to the drive shaft of the counter.

---

The present invention relates to an apparatus for measuring of lengths by impulse counting in general, and to such an apparatus for measuring of lengths, whereby a displacement of a division relative to a reading device for a full-numbered or a part-numbered multiple of an interval of a division takes place and the value to be measured is determined by impulse-counting.

In an apparatus of this type, the light is fed through an immovable grid and a grid of a photo-electric cell disposed parallel thereto and reciprocable in its plane, which photo-electric cell transmits the received impulses to an indicating device consisting of electronic multi-vibrators and counting arrangements, and thus provides an indication of the measuring result.

In known arrangements of this type, the only problem solved, however, is the sub-division of an interval of the division such, that at its maximum, four discrete indications for each displacement for a graduation distance of the division are possible, whereby, due to the use of the arrangement, only limited applications are permitted. In addition to this functional drawback which, as has been stated above, resides in the limited sub-division of an interval, a further and more important drawback resides in the fact, that, in order to bring about the mentioned effect, the structural arrangement must be of a very complicated nature, caused by the use of voluminous electronic switching elements, so that the known devices are extremely cumbersome and expensive as well as readily subject to disturbances.

It is, therefore, one object of the present invention to provide an apparatus for subdividing of an interval of the measuring division, which avoids the above-stated drawbacks and which permits a more exact reading with appreciably simplified means.

It is another object of the present invention to provide an apparatus for subdividing of an interval of the measuring division, wherein at least two approximately sinusoidal electrical signals produced by means of statically operating transformers, phase-shifted relative to each other, are fed in dependency upon the traveled path to the windings of a synchronous motor, which is operatively connected with the driving shaft of a counting device.

It is already known to use so-called rotating-field-transmitters and receivers for the transmission of position indications. In the known instances, an auxiliary-alternatnig voltage is required for the rotating-field-transmitter for the production of the electric transmission signal, which rotating-field-transmitter feeds to the rotating coil of the rotating-field-transmitter and induces different alternating voltages into the stator coils of the rotating-field-transmitter, which stator coils are angularly set off relative to each other.

The arrangement of the present invention has, on the other hand, the advantage that no auxiliary alternating voltage is required. Another advantage resides in the fact that the position displacement, required for a complete cycle of the electric signal, can be held appreciably smaller than in the known arrangements, whereby precision can be appreciably increased.

If a rapid indication of the indicating system is desired, it is possible that in case of a great acceleration, the synchronous motor cannot follow directly.

It is, therefore, still another object of the present invention to provide an apparatus for subdividing of an interval of the measuring division, wherein two synchronous motors are disposed in parallel arrangement in a circuit, which synchronous motors are mechanically independent from each other and are different as to the number of poles, whereby a purely electrical transmission between the two synchronous motors is provided. If the transmitter system performs, for instance, highly increased movements, the synchronous motor with the greater number of poles can follow directly, while the motor with the fewer number of poles under circumstances performs at first only reciprocating movements. As soon, however, as the transmitting system comes to a rest, the synchronous motor with the fewer poles will turn into its indication position.

With these and other objects in view, which will become apparent in the following detailed description, the present invention will be clearly understood in connection with the accompanying drawings, in which:

FIGURE 1 is a schematic arrangement for sensing and counting, respectively, total intervals of scales and fractions thereof;

FIG. 2 is an enlarged section along the lines 2—2 of FIG. 1 of the grid-scale and the corresponding line grid of the example disclosed in FIG. 1;

FIG. 3 is a diagram disclosing the light-current fluctuations resulting during the sensing in dependency upon the traveled path;

FIG. 4 is a diagram depicting the relation between the input signals of the synchronous motor and its rotary angle, whereby the letters A to H used for the indication of the angular positions correspond with those in FIG. 5;

FIG. 5 discloses schematically the structure and the function of a two-pole synchronous motor, whereby the intermediate values, shown in FIG. 4, are indicated by A to H; and FIG. 6 is a showing of a selectively assumed displacement $s$ in dependency upon the time and also in dependency upon the time the corresponding values of the input values $I_1$ and $I_2$ of the synchronous motor, as well as for three different positions the view of the indicating table.

Referring now to the drawings, and in particular to FIGS. 1 and 2, which disclose an embodiment by example only, in which it is assumed that the statically operating transformer, which produces the approximately sinusoidal signal in dependency upon the traveled path, comprises a grid scale 1 with a grid line plate 2 moving thereover at a slight distance therefrom. Sections of the scale 1 and of the grid line plate 2 are shown at an enlarged scale in FIG. 2, in order to clarify the relative phase displacement of the upper to the lower half of the line plate 2. The scale 1 and the line plate 2 are traversed by light rays, which pass through two lenses 3 and 4 and are directed onto two photo-diodes $P_1$ and $P_2$. As a result of this sensing, two output signals $S_1$ and $S_2$, as shown in FIG. 3, result, which can be considered as approximately sinusoidal in addition to an additive constant in dependency upon the traveled path. If for more exact measurements the sinusoidal shape of the signal is insufficient, a more exact sinusoidal shaped signal can be produced by a corresponding design of the sensing line plate and of the grid scale, respectively. Generally, however, the approximation to the sinusoidal shape obtained by sensing of a grid scale with parallel lines suffices, which is the reason, why no further explanation for the production of an exactly sinusoidal signal in dependency upon the path is given. It is, of course, to be understood, that instead of transparent scales, reflecting scales can be used.

Upon movement of the grid scale 1 relative to the grid line plate 2 in direction of the arrow $s$ (FIG. 2), the upper half $1a$ of the grid scale 1 passes on the upper half $2a$ of the grid line plate 2, and in the same manner the lower half $1b$ of the grid line plate 2 passes on the lower half $2b$ of the grid line plate 2. The amount of light passed by the upper half $1a$ and $2a$ along path $s$ varies in accordance with the curve $S_2$ of FIG. 3. The amount of light passed by the lower half $1b$ and $2b$ along path $s$ varies in accordance with the curve $S_1$ of FIG. 3. With corresponding relative phase displacement the electric signals $I_1$ and $I_2$ (FIG. 4) are emitted accordingly.

The signals $S_1$ and $S_2$ delivered from the photo-diodes $P_1$ and $P_2$ are fed to two amplifiers $V_1$ and $V_2$, respectively. These amplifiers simultaneously cause the signal of FIG. 3 with an additive constant to be transformed into a pure alternating voltage signal during non-uniform motion. This can be brought about by any known means, for instance, by subtraction of a constant direct voltage.

The four amplifier outputs W, X, Y and Z are connected with the stator windings of two synchronous motors $M_1$ and $M_2$, which are distinguished by the fact that the synchronous motor $M_1$ has 20 poles, and the synchronous motor $M_2$, however, has two poles, so that during a complete cycle of the input signal, the synchronous motor $M_1$ performs $\frac{1}{10}$ of a rotation and the synchronous motor $M_2$ performs a complete rotation. The shaft $L_1$ of the synchronous motor $M_1$ is operatively connected with the counting roller of a mechanical counting device $K_1$, while the shaft $L_2$ of the motor $M_2$ carries a pointer rotating about a scale $K_2$.

As can be determined from FIGS. 4 and 5, the two-pole synchronous motor can assume any selected rotary position, corresponding with the position of the resulting magnetic field produced by the two windings. If the input signals $I_1$ and $I_2$ run through a complete cycle, indicated in FIG. 4 by the letters A to H, the rotor of the synchronous motor performs a continuous rotary movement and can stop at any selected intermediate position, also between the positions indicated by the letters A to H in FIGS. 4 and 5. By means of the synchronous motor it is also possible to sub-divide an interval of the grid division 1 in an analogous manner.

If it is assumed, for instance, that the grid constant of the grid scale 1 amounts to 10 $\mu$m., a displacement of the sensing plate 2 relative to the grid scale 1 for 10 $\mu$m. amounts to a complete rotation of the rotor of the synchronous motor $M_2$. If, as it is shown in FIG. 1, the scale $K_2$ is divided into 10 parts, each part indicates a displacement range of 1 $\mu$m.

It would be possible, without difficulty, to drive directly from the shaft $L_2$ a decadal counting device, so that by means of a single motor $M_2$ not only can the fractions of a ten $\mu$m. interval be read, but also multiples thereof. It would be, however, a presumption therefor, that the movement to be measured does not have too great accelerations, since otherwise the possibility exists, that the synchronous motor does not start, but rather performs only pendulum movements. At the point of rest, the fractions of a 10 $\mu$m. would be again indicated correctly, but however, the indication of a multiple of the 10 $\mu$m. intervals would be faulty. If no limitation is given, to permit only low acceleration and retardation values of the movement, the total multiples of the 10 $\mu$m. intervals are not read on a counting device $K_1$, which is driven directly from the shaft $L_2$, but rather on a counting device $K_1$ driven by a particular synchronous motor $M_1$ having a greater number of poles. The indicator $K_1$ is mechanically completely independent from the indicator $K_2$, so that the counting device $K_1$ can run synchronously with the displacement to be measured even, when the pointer on the scale $K_2$ cannot perform this due to large accelerations.

The rotor of the synchronous motor is connected with the shaft $L_2$. It has, however, no electric connection with the terminals W, X, Y and Z. The electric signals $I_1$ and $I_2$ produce a magnetic field by means of the coils, which tends to follow the rotor. The motor $M_1$ is designed similarly, with the difference, that it has not only two, but twenty windings fed alternately by the signals $I_1$ and $I_2$.

Referring now again to the drawings, and in particular to FIG. 6, showing the signal run $I_1$ and $I_2$ in dependency upon the displacement $s$ to be measured. Here it is again assumed, that the grid constant of the grid scale amounts to 10 $\mu$m., so that a complete cycle of the signals $I_1$ and $I_2$ corresponds to a displacement of 10 $\mu$m. It can be recognized from FIG. 6, that the relative phase position of the signals is likewise reversed upon a change of the direction of movement. The indicating values of the counting device $K_1$ and of the rotating pointer $K_2$ are disclosed for three positions. It can easily be read, that the three positions 92.5 $\mu$m., 36.6 $\mu$m. and 30.8 $\mu$m. are in coincidence with the movement-curve $s$ and the signal curves $I_1$ and $I_2$.

It should be added for the application of the present invention, that the possibility exists to set automatically the coordinates such, that the impulse number is compared with a pre-set number, whereby upon reaching the set number, a control process is initiated, which stops the movement.

While I have disclosed several embodiments of the present invention, it is to be understood that these embodiments are given by example only and not in a limiting sense, the scope of the present invention being determined by the objects and the claims.

I claim:

1. An apparatus for measuring the relative position of two parts longitudinally or rotatably movable relative to each other, comprising
   a source of light,
   a grid scale plate,
   a grid line plate movable relative to said grid scale plate,
   said grid line plate being divided into a first grid line portion and a second grid line portion,
   said first and second grid line portions being non-aligned relative to each other,
   means for passing light emitted from said source of light in two beams, one beam being directed onto said grid scale plate and said first grid line portion of said grid line plate, and the other beam being directed to said grid scale plate and said second grid line portion of said grid line plate, thereby producing two emitted beams of phase displaced beam intensity corresponding to the relative displacements of said first and second grid line portions,
   photosensitive means responsive to said two emitted beams, respectively, for generating two approximately sinusoidal phase displaced electrical signals,
   a first synchronous motor having windings and a rotor including a rotor shaft,
   connecting means for feeding said two approximately sinusoidal phase displaced electrical signals to said windings, thereby causing said rotor to turn, and
a counter including a drive shaft, the latter being coupled to said rotor shaft, whereby the count in said counter represents a measure of the relative position of said two parts.

2. The apparatus, as set forth in claim 1, further comprising
a second synchronous motor including a second motor shaft,
said second synchronous motor being mechanically independent of said first synchronous motor, having a different number of poles and electrically disposed in parallel relative to said first synchronous motor, said second motor shaft carrying a pointer adapted to rotate about a scale,
whereby a further measure of the relative position of said two parts is provided.

References Cited
UNITED STATES PATENTS

| | | | |
|---|---|---|---|
| 2,471,788 | 5/1949 | Snyder | 177—351 |
| 2,537,427 | 1/1951 | Seid | 318—28 |
| 2,656,106 | 11/1953 | Stabler | 235—92 |

MAYNARD R. WILBUR, *Primary Examiner.*

G. R. EDWARDS, *Assistant Examiner.*